United States Patent [19]

Claussen et al.

[11] Patent Number: 5,319,988
[45] Date of Patent: Jun. 14, 1994

[54] ASSEMBLY FOR CHECKING SPRING PATTERNS

[75] Inventors: Steven W. Claussen, Clontarf; Michael D. O'Dougherty, Maplewood, both of Minn.

[73] Assignee: C.A.P., Inc., Benson, Minn.

[21] Appl. No.: 851,994

[22] Filed: Mar. 13, 1992

[51] Int. Cl.$^5$ .................................. G01N 19/00
[52] U.S. Cl. .............................. 73/865.9; 73/865.8; 73/168
[58] Field of Search ............ 73/168, 865.8, 865.9, 73/119 A; 239/74

[56] References Cited

U.S. PATENT DOCUMENTS 4,539,842  9/1985  McCollum et al. .............. 73/168

FOREIGN PATENT DOCUMENTS

| 1041732 | 9/1983 | U.S.S.R. | 73/119 A |
| 1233952 | 5/1986 | U.S.S.R. | 73/865.9 |
| 1261720 | 10/1986 | U.S.S.R. | 73/865.9 |

OTHER PUBLICATIONS

Product Literature from Accu Tech Associates Inc., Bozeman, Mont. entitled "Take The Final Step to Complete Your Sprayer Tune-up".
Thornton et al, "Apparatus used for Spray Nozzle Evaluation at the Weed Research Organization", Dec. 1974, pp. 465–475.
"Equipment for Testing Spraying Machines", May 1987.

*Primary Examiner*—Hezron E. Williams
*Assistant Examiner*—Nashmiya Ashraf
*Attorney, Agent, or Firm*—William L. Huebsch

[57] ABSTRACT

An assembly including a tray-like member having a multiplicity of parallel adjacent elongate troughs. Each of the troughs has a major portion adjacent a first edge, and a minor portion adjacent a second edge; and the assembly includes a transparent polymeric sheet sealed over the minor portions of the troughs to define receptacles for liquid. After the major portions of the troughs are positioned beneath the spray zone at a specific distance from the nozzles with the troughs extending transverse of the elongate spray zone and after liquid is sprayed through the spray nozzles upon its upper surface, the assembly can be tipped so that the liquid collected in the troughs will run into the receptacles and the comparative resultant levels of liquid the receptacles will provide a visual indication of the uniformity of the amount of liquid being delivered by the nozzles along the spray zone at the specific distance.

11 Claims, 2 Drawing Sheets

ASSEMBLY FOR CHECKING SPRING PATTERNS

TECHNICAL FIELD

The present invention relates to assemblies for use in determining the relative rate of delivery of a liquid sprayed through spray nozzles along an elongate spray zone at a specific distance from the spray nozzles.

BACKGROUND ART

Assemblies for use in determining the relative rate of delivery of a liquid sprayed through spray nozzles along an elongate spray zone at a specific distance from the spray nozzles are known. U.S. Pat. No. 4,539,842 and German Utility Model No. 6804628 provide examples. The assembly described in U.S. Pat. No. 4,539,842 includes a tray-like member having evenly spaced alternating first ridge portions and recessed portions defining along its upper surface a multiplicity of parallel adjacent elongate troughs extending from one edge, and an end ridge portion transverse of the troughs along that first edge that provides and end wall for the troughs. The tray like member is adapted to receive removable collector test tubes longitudinally aligned with ends of the troughs opposite its first end ridge, and is mounted on a height adjustable cart so that troughs can be positioned beneath an elongate spray zone at a specific distance from nozzles producing the spray zone with the troughs extending transverse of the elongate spray zone. After liquid is sprayed through the spray nozzles upon the upper surface, the assembly can be tipped so that the liquid collected in the troughs will run along the troughs into the test tubes and the comparative resultant levels of liquid the test tubes will provide a visual indication of the uniformity of the amount of liquid being delivered by the nozzles along the spray zone at the specific distance. While the assembly described in U.S. Pat. No. 4,539,842 should be effective in providing a visual indication of the uniformity of the amount of liquid being delivered by nozzles along a spray zone at specific distances from the nozzles, it has a large, complex and expensive structure so that some persons that might benefit from using it may not do so because of its expense, and/or because of the inconvenience of transporting and storing it between uses.

DISCLOSURE OF INVENTION

The present invention provides a relatively inexpensive, easily used, moved and stored effective assembly for use in determining the relative rate of delivery of a liquid sprayed through spray nozzles along an elongate spray zone at a specific distance from the spray nozzles.

That assembly according to the present invention comprises a tray-like member having evenly spaced alternating first ridge portions and recessed portions defining along an upper surface of the member, a multiplicity of parallel adjacent elongate troughs extending between first and second edges of the tray like member, a first end ridge portion transverse of the troughs adjacent the first edge, and a second end ridge portion transverse of the troughs adjacent the second edge, with end ridge portions providing end walls for the troughs. Each of the troughs has a major portion adjacent the first edge, and a minor portion adjacent the second edge; and the assembly includes a transparent polymeric sheet extending over the minor portions of the troughs and sealed to the tray-like member along the parts of the first ridge like portions defining the minor portions of the troughs and along the second end ridges to define receptacles for liquid. After the major portions of the troughs are positioned beneath the spray zone at the specific distance from the nozzles with the troughs extending transverse of the elongate spray zone and after liquid is sprayed through the spray nozzles upon the upper surface, the assembly can be tipped so that the liquid collected in the troughs will run along the troughs into the receptacles and the comparative resultant levels of liquid the receptacles will provide a visual indication of the uniformity of the amount of liquid being delivered by the nozzles along the spray zone at a specific distance from the nozzles.

Preferably the means for sealing comprises a thick layer of resiliently elastic sealing material (e.g., a 3/16 inch or 0.5 centimeter thick layer of styrene base adhesive) between the sheet of transparent material and the second end ridge portion and between the sheet of transparent material and the parts of the first ridge portions defining the minor portions of the troughs. Such a thick layer of resiliently elastic sealing material can maintain the seal between the tray like member and the sheet of transparent polymeric material despite flexing of the assembly that will inevitably occur.

The assembly can further include brightly colored members adapted to float on water within the receptacles, and can include means (e.g., ledge portions of the tray-like member projecting partially into the minor portions of the troughs toward the sheet of transparent material adjacent the intersections between the major and the minor portions of the troughs) for retaining the brightly colored members in the receptacles while allowing liquid to flow into and out of the receptacles.

The tray-like member can include a support surface opposite the upper surface adapted to be supported on a horizontal surface, which support surface is generally parallel to its upper surface and is spaced from the upper surface by a predetermined distance (e.g., about about 7.62 centimeters or 3 inches) about equal to the height of post emergent row crops so that when the support surface is supported on the surface of the earth the relative amounts of liquid sprayed by nozzles along a spray zone onto the upper surface of the tray like member will be about equal to the relative amounts of liquid that would be sprayed by those nozzles onto post emergent row crops.

Also, the tray-like member can be vacuum formed from a polymeric sheet so that it is of generally uniform thickness and has a peripheral lip portion extending around its upper surface and projecting generally at a right angle to its upper surface, with the support surface being the distal edge surface of the peripheral lip portion.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
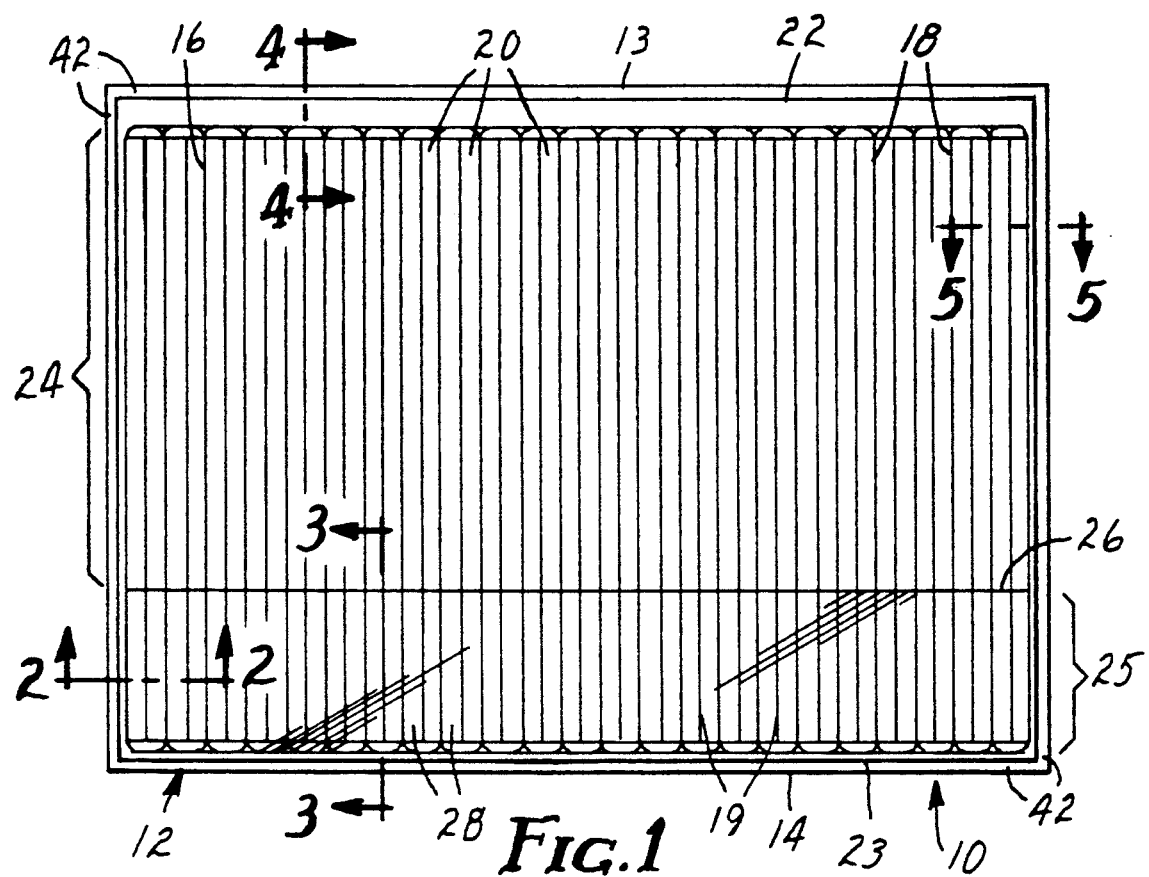
FIG. 1 is a top plan view of an assembly according to the present invention for use in determining the relative rate of delivery of a liquid sprayed through spray nozzles along an elongate spray zone at a specific distance from the spray nozzles.

Referring now to the drawing, there is shown a spray pattern check assembly 10 according to the present invention for use in determining the relative rate of delivery of a liquid sprayed through spray nozzles along an elongate spray zone at a specific distance from the spray nozzles.

Generally the assembly 10 comprises a tray-like member 12 having first and second opposite edges 13 and 14, an upper surface 16, and evenly spaced alternating first ridge portions 18 and recessed portions 19 defining along the upper surface 16 a multiplicity of parallel adjacent elongate troughs 20 extending between the edges 13 and 14. The tray-like member 12 also has a first end ridge portion 22 transverse of the troughs 20 adjacent the first edge 13 and a second end ridge portion 23 transverse of the troughs 20 adjacent the second edge 14, which end ridge portions 22 and 23 provide end walls for the troughs 20. Each of the troughs 20 has a major portion 24 adjacent the first edge 13, and a minor portion 25 adjacent the second edge 14. A transparent polymeric sheet 26 extends over the minor portions 25 of the troughs 20, the parts of the first ridge portions 18 defining the minor portions 25 of the troughs 20, and the second end ridge portion 23. Means in the form of a layer 27 of sealing material seals the transparent polymeric sheet 26 to the second end ridge portion 23 and to the parts of the first ridge portions 18 defining the minor portions 25 of the troughs 20 so that the transparent sheet 26 and the parts of the tray-like member 12 defining the minor portions 25 of the troughs 20 provide or define receptacles 28 for liquid.

After positioning the major portions 24 of the troughs 20 beneath the spray zone at the specific distance from the nozzles with the troughs 20 extending transverse of the elongate spray zone and after spraying liquid through the spray nozzles upon the upper surface 16, the assembly 10 can be tipped so that the liquid collected in the troughs 20 will run along the troughs 20 into the receptacles 28 and the comparative resultant levels of liquid visible within the receptacles 28 through the transparent polymeric sheet 26 will provide a visual indication of the uniformity of the amount of liquid being delivered by the nozzles along the spray zone at the specific distance. Subsequently, the liquid can be poured from the receptacles 28 by inverting the assembly 10.

Figure 2:
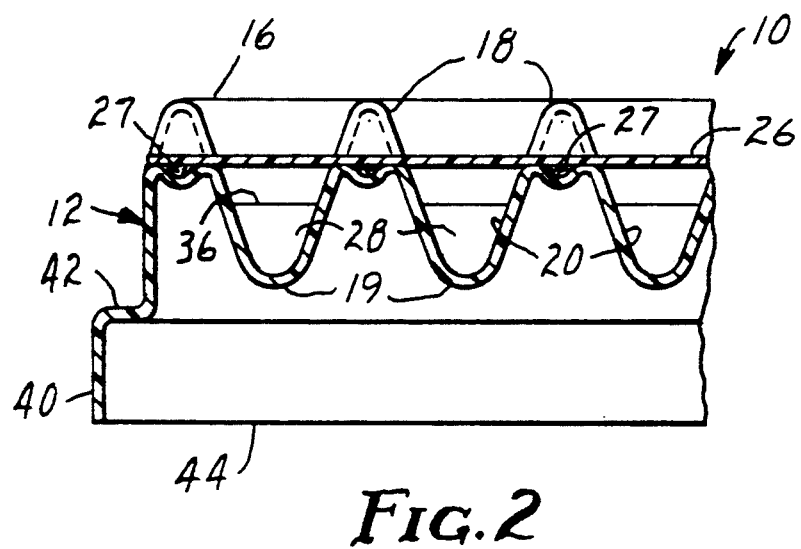
FIG. 2 is an enlarged fragmentary view taken approximately along line 2—2 of FIG. 1.
Figure 3:
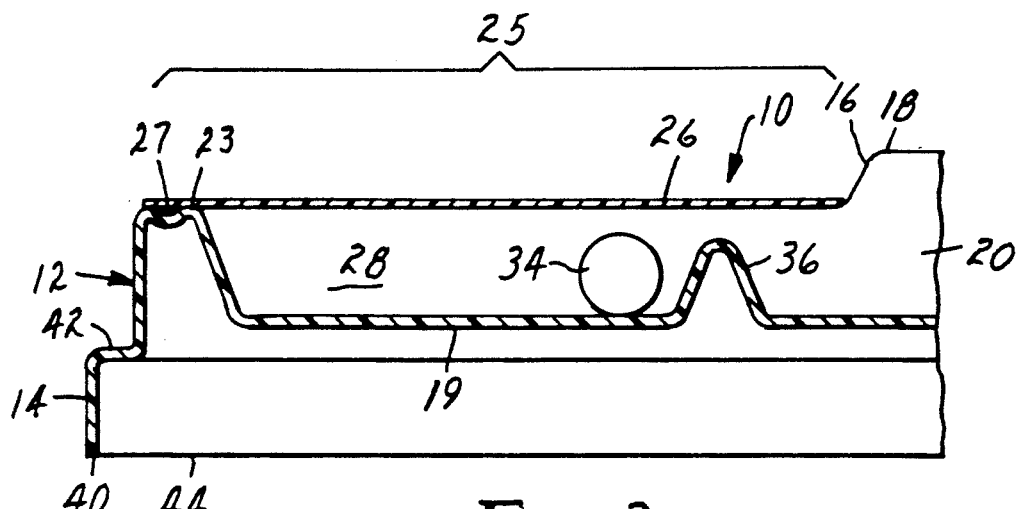
FIG. 3 is an enlarged fragmentary view taken approximately along line 3—3 of FIG. 1.
Figures 4, 5:
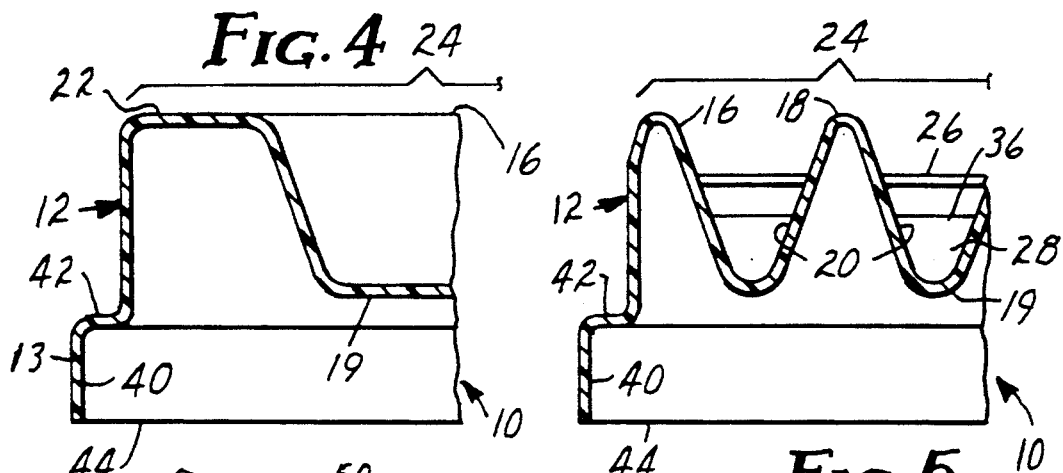
FIG. 4 is an enlarged fragmentary view taken approximately along line 4—4 of FIG. 1.
FIG. 5 is an enlarged fragmentary view taken approximately along line 5—5 of FIG. 1.

The layer 27 of sealing material that provides the means for sealing between the transparent polymeric sheet 26 and the second end ridge portion 23 and between the transparent polymeric sheet 26 and the parts of the first ridge portions 18 defining the minor portions 25 of the troughs 20 is thick and remains resiliently elastic while performing its sealing function. Such a thick layer of resiliently elastic sealing material can maintain the seal between the tray-like member 12 and the transparent polymeric sheet 26 despite flexing of the assembly 10 that will inevitably occur during its use. As illustrated (see FIGS. 2 and 3), there are recesses adapted to receive the layer 27 of sealing material extending longitudinally along the tops of the second end ridge portion 23 and the parts of the first ridge portions 18 defining the minor portions 25 of the troughs 20.

Spherical brightly colored members 34 adapted to float on water (e.g., bright red polymeric spheres about 1.27 centimeters or ½ inch in diameter made of polypropylene) are positioned within the receptacles 28. Means for retaining the brightly colored members 34 in the receptacles 28 while allowing liquid to flow into and out of the receptacles 28 are provided by ledge portions 36 of the tray-like member 12 projecting into the minor portions 25 of the troughs 20 toward the transparent polymeric sheet 26 adjacent the intersections between the major and the minor portions 25 of the troughs 20. The ledge portions 36 are spaced from the transparent polymeric sheet 26 by a distance (e.g., 0.87 centimeter or 0.34 inch) that is less that the predetermined diameter dimension of the brightly colored members 34.

As illustrated, the tray-like member 12 is a vacuum formed polymeric sheet of generally uniform thickness (e.g., about 0.125 inch or 0.317 centimeter thick) and has a peripheral lip portion 40 with a central outwardly projecting reinforcing step 42 extending around the upper surface 16. The peripheral lip portion 40 projects generally at a right angle to the upper surface 16 of the tray-like portion 12. The distal edge surface of the peripheral lip portion 40 provides a support surface 44 for the tray-like portion 12 opposite the upper surface 16, which support surface 44 is adapted to be supported on a horizontal surface (e.g., the ground), is generally parallel to the upper surface 16, and is spaced from the upper surface 16 by a predetermined distance about equal to the height of post emergent row crops (i.e., about 7.62 centimeters or 3 inches). Thus, when the support surface 44 is supported on the surface of the earth the relative amounts of liquid sprayed by nozzles along a spray zone onto the upper surface 16 of the tray-like member 12 will be about equal to the relative amounts of liquid that would be sprayed by those nozzles onto the upper surfaces of post emergent row crops.

As one useful example, the tray-like member 12 can be a vacuum formed polystyrene sheet about 0.125 inch or 0.317 centimeter thick that is about 47.75 inches or 121 centimeters wide in a direction normal to the troughs 20 and about 34 inches or 86 centimeters deep in a direction parallel to the troughs 20, with the major portions 24 of the troughs 20 being about 22.625 inches or 57.5 centimeters long, being about 1.5 inches or 3.8 centimeters deep, and being about 2 inches or 5 centimeters wide, normal to the first ridge portions 18. The transparent polymeric sheet 26 can be a 0.060 inch or 0.152 centimeter thick sheet of transparent buterate. The layer of resiliently elastic sealing material can be an about 3/16 inch or 0.5 centimeter thick layer of styrene base adhesive (e.g., the styrene base adhesive commercially designated "Eclectic E-6000" sold by Eclectic Products, Incorporated, San Pedro, Calif.) that has the properties of remaining flexible and bonded to both the transparent polymeric sheet 26 and to the tray-like member 12 of the material indicated above despite moderate flexing of the assembly 10 over a temperature range of from 40 to 110 degrees Fahrenheit.

Figure 6:
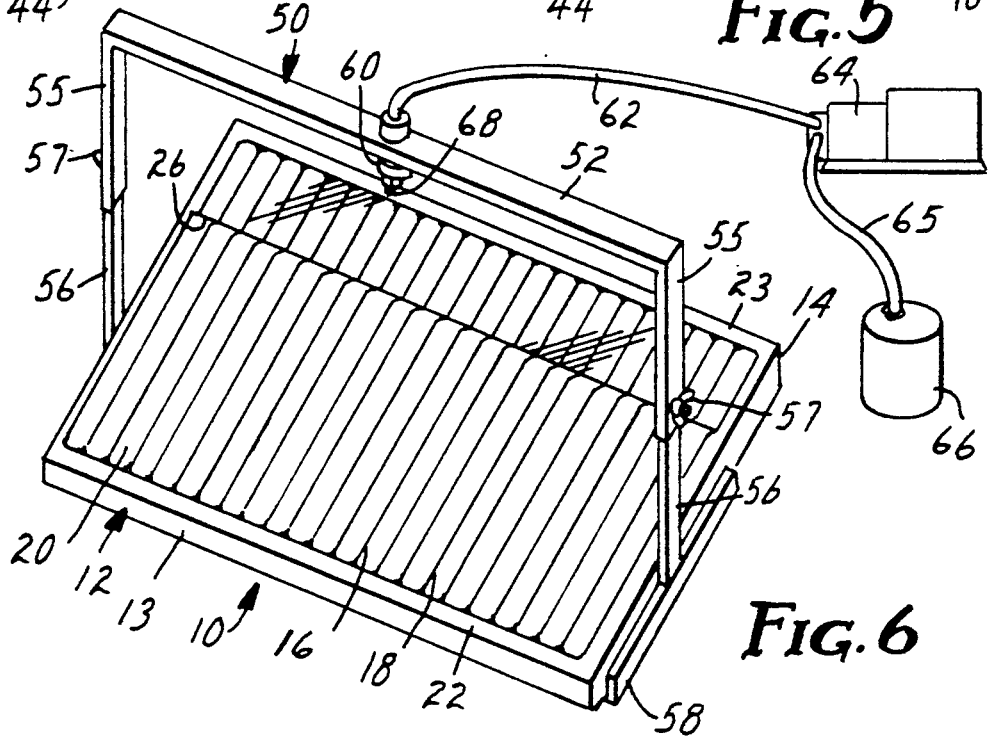
FIG. 6 is a schematic perspective view of a combination of the assembly as illustrated in FIG. 1 in combination with nozzle support and pumping equipment that could be used to check nozzles.

Referring now to FIG. 6, there is illustrated the assembly 10 as illustrated in FIGS. 1 through 5 in combination with nozzle support and pumping equipment 50 that can be used to check the condition of spray nozzles at a location in which agricultural spraying equipment is not normally operated, such as in a replacement nozzle sales facility. Generally, the nozzle support and pumping equipment 50 includes a nozzle support bar 52, means for supporting the nozzle support bar 52 at different distances above the upper surface 16 of the tray like member 12 in the assembly 10, housing means mounted on the nozzle support bar 52 for removably receiving a nozzle 68 with the outlet opening of the nozzle 68 directed at the upper surface 16 of the tray like member 12, and means for pumping liquid through the nozzle 68 removably received in the housing means. As illustrated, the nozzle support bar 52 extends between the upper ends of two vertical supports each having two portions 55 and 56 that are relatively slidable to provide the means for supporting. The vertical supports can be adjusted to have various lengths, and can be fixed at a selected length by a wing nut 57 on a bolt fixed to the portion 56 and projecting through a longitudinally extending slot in the portion 55. Transverse feet 58 are fixed at the ends of the vertical supports the nozzle support bar 52, which feet 58 are spaced to be positioned along the opposite ends of the assembly 10 with the nozzle support bar 52 extending transversely across the major portions 24 of the troughs 20. A nozzle receiving housing 60 providing the housing means is attached centrally along the nozzle support bar 52. Included in the pumping means is a hose 62 extending from the housing 60 to an electrically operated pump assembly 64 that can pump liquid received through an inlet hose 65 from a source (e.g., a container 66 as illustrated) through the hose 62, nozzle receiving housing 60, and the nozzle 68 to be tested that is removably retained in the housing 60 from which the liquid will be sprayed onto the upper surface 16 of the tray-like member 12 from a predetermined height set by adjusting the lengths of the vertical supports. After liquid is sprayed through the spray nozzle 68 in the housing 60 upon the upper surface 16, the assembly 10 can be tipped so that the liquid collected in the troughs 20 will run along the troughs 20 into the receptacles 28 and the comparative resultant levels of liquid the receptacles 28 will provide a visual indication of the uniformity of the amount of liquid being delivered by the nozzle 68 along its spray zone at a specific distance from the nozzle 68, thereby providing an indication that the nozzle is either functioning properly, or has been worn or partially plugged.

The assembly 10 according to the present invention has now been described with reference to one embodiment thereof used alone or in combination with other equipment. It will be apparent to those skilled in the art that many changes can be made in the embodiment or uses for that embodiment that are described without departing from the scope of the present invention. Thus the scope of the present invention should not be limited to the structures or uses described in this application, but only by structures and uses described by the language of the claims and the equivalents of those structures and uses.

We claim:

1. An assembly for use in determining the relative rate of delivery through different spray nozzles of a liquid sprayed through the spray nozzles along an elongate spray zone at a specific distance from the spray nozzles, said assembly comprising:

a tray-like member having first and second opposite edges, an upper surface, evenly spaced alternating first ridge portions and recessed portions defining along said upper surface a multiplicity of parallel adjacent elongate troughs extending between said edges, a first end ridge portion extending transverse to the length of said troughs adjacent said first edge, and a second end ridge portion extending transverse to the length of said troughs adjacent said second edge, said end ridge portions providing end walls for said troughs, said troughs having major portions adjacent said first edge defined by major parts of said first ridge portions and of said recessed portions, and minor portions adjacent said second edge defined by minor parts of said first ridge portions and of said recessed portions;

a transparent polymeric sheet extending over said minor parts of the first ridge like portions and of said recessed portions defining the minor portions of said troughs, and over said second end ridge portion; and means for sealing said transparent polymeric sheet to the second end ridge portion and to the minor parts of the first ridge portions defining the minor portions of the troughs so that the transparent sheet and the minor parts of the first ridge portions defining the minor portions of said troughs provide receptacles for liquid, and so that after positioning the major portions of the troughs beneath the spray zone at the specific distance from the nozzles with the troughs extending transverse of the elongate spray zone and after spraying liquid through the spray nozzles upon the upper surface that is collected by the major portions of the troughs, the assembly can be tipped so that the liquid collected in the troughs will run along the troughs into the receptacles and the comparative resultant levels of liquid in the receptacles will provide a visual indication of the uniformity of the amount of liquid being delivered by the nozzles along the spray zone at the specific distance.

2. An assembly according to claim 1 wherein said means for sealing comprises a layer of resiliently elastic sealing material between the sheet of transparent material and said second end ridge portion and between the sheet of transparent material and the minor parts of the first ridge portions.

3. An assembly according to claim 2 further including brightly colored members adapted to float on liquid within the receptacles, and means for retaining the brightly colored members in the receptacles while allowing liquid to flow into and out of the receptacles.

4. An assembly according to claim 1 further including brightly colored members adapted to float on liquid within the receptacles, and means for retaining the brightly colored members in the receptacles while allowing liquid to flow into and out of the receptacles.

5. An assembly according to claim 4 wherein said brightly colored members are spherical and each have essentially the same predetermined diameter dimension, and said tray-like member comprises ledge portions projecting into the minor portions of the troughs toward the sheet of transparent material adjacent the major portions of the troughs to provide said means for retaining the brightly colored embers in the receptacles while allowing liquid to flow into and out of the receptacles, said ledge portions being spaced from said sheet of transparent material by a distance slightly less than said predetermined diameter dimension.

6. An assembly according to claim 1 wherein said tray-like member includes a support surface opposite said upper surface adapted to be supported on a horizontal surface, said support surface being generally parallel to said upper surface and being spaced from said upper surface by a predetermined distance.

7. An assembly according to claim 6 wherein said predetermined distance is about 7.62 centimeters or 3 inches.

8. An assemble according to claim 6 wherein said tray-like member is a vacuum formed polymeric sheet of generally uniform thickness having a peripheral lip portion including a distal edge and extending around said upper surface and projecting generally at a right angle to said upper surface, with said support surface being the distal edge surface of said peripheral lip portion.

9. An assembly according to claim 8 wherein said vacuum formed polymeric sheet is about 0.125 inch or 0.317 centimeter thick and is made of polystyrene.

10. An assembly according to claim 1 wherein said tray-like member is about 47.765 inches or 121 centimeters wide in a direction normal to the length of said troughs and about 34 inches or 86 centimeters long in a direction parallel to said troughs, with said major portions of said troughs being about 22.625 inches or 57.5 centimeters long, being about 1.5 inches or 3.8 centimeters deep, and being about 2 inches or 5 centimeters wide in a direction normal to said ridge portions.

11. An assembly according to claim 1 in combination with nozzle support and pumping equipment that can be used to check the condition of spray nozzles at a location in which agricultural spraying equipment is not normally operated, said nozzle support and pumping equipment including a nozzle support bar, means for supporting the nozzle support bar at different distances above the upper surface of the tray-like portion of the assembly, housing means for removably receiving a nozzle to be tested attached on said nozzle support bar with the outlet opening of the nozzle directed at the upper surface of the tray-like member, and means for pumping liquid through a nozzle removably received in said housing means to provide, after liquid is pumped through the nozzle in the housing means upon the upper surface of the tray like member by the pumping means and the assembly is tipped so that the liquid collected in the troughs runs into the receptacles, visible comparative resultant levels of liquid in the receptacles indicating the uniformity of the amount of liquid being delivered by the nozzle at a specific distance from the nozzle.

* * * * *